United States Patent [19]

Tsuzuki

[11] Patent Number: 4,578,568
[45] Date of Patent: Mar. 25, 1986

[54] DATA READER

[75] Inventor: Hanzou Tsuzuki, Tokyo, Japan

[73] Assignee: Casio Computer Co., Ltd., Tokyo, Japan

[21] Appl. No.: 544,771

[22] Filed: Oct. 24, 1983

[30] Foreign Application Priority Data

Oct. 28, 1982 [JP] Japan ................. 57-188174

[51] Int. Cl.[4] ............................................. G06K 7/00
[52] U.S. Cl. .................................. 235/436; 235/449; 235/462; 307/358
[58] Field of Search ............... 235/436, 449, 462, 466; 307/358

[56] References Cited

U.S. PATENT DOCUMENTS

| 3,708,678 | 1/1973 | Kreda | 307/358 X |
| 3,942,038 | 3/1976 | Hutch | 307/358 |
| 4,058,705 | 11/1977 | Cannon | 235/449 |

Primary Examiner—David L. Trafton
Attorney, Agent, or Firm—Pennie & Edmonds

[57] ABSTRACT

A data reader has a data reading means for reading data from a recording medium and producing an analog signal. The data reader also has a switching circuit having one terminal connected to the output terminal of the reading means. When the potential difference across the two terminals of the switching circuit falls within a predetermined range, the switching element is turned off. The switching element is turned on when the potential difference falls outside the predetermined range. The reader further has a hold circuit connected to the switching circuit and for holding a potential applied thereto. The reader also has a comparator which compares the analog signal from the data reading means with the potential held by the hold circuit and which produces a digital signal.

4 Claims, 6 Drawing Figures

DATA READER

BACKGROUND OF THE INVENTION

The present invention relates to an improvement in a data reader which compares an analog signal from a reading means for reading recorded data with a reference voltage signal so as to convert the analog signal into a digital signal.

An optical data reader such as a bar code reader is conventionally known. In such a reader, light is radiated onto a medium on which predetermined data is recorded (printed) in the form of bar codes. The differences in reflectivity are converted into an electrical signal (magnitude of a current) for allowing reading of the bar code data. A data reader for magnetically reading such data is also known.

Methods of converting an analog signal into a digital signal of logic level "0" or "1" include the DC method and the AC method. FIG. 1 shows a conventional bar code reader which adopts the DC method. The bar code reader has a hand scanner 2 for manually scanning a medium (label) 1 on which bar codes are recorded, an amplifier 3 for amplifying the analog signal read by the hand scanner 2, a comparator 4 which receives at its positive input terminal an analog signal from the amplifier 3, and a variable resistor 5 for supplying a reference input voltage to the negative input terminal of the comparator 4. The comparator 4 produces a digital signal which corresponds to the output voltage from the amplifier 3.

A conventional bar code reader adopting the AC method has, for example, the structure as shown in FIG. 2. The same reference numerals as used in FIG. 1 denote the same parts as in FIG. 1, and a detailed description thereof will be omitted. The bar code reader further has a differentiator 6 consisting of a capacitor C1 and a resistor R. The differentiator 6 receives an output voltage from the amplifier 3 and cuts off the DC component of the input voltage so as to obtain an AC component thereof. The reader also has a buffer amplifier 7 for non-inverting amplification of an output from the differentiator 6. An output from the buffer amplifier 7 is supplied to the positive input terminal of the comparator 4. In this case, the negative input terminal of the comparator 4 receives a ground level voltage as a reference voltage.

In each of the bar code readers adopting the AC and DC methods, the reflectivity differs depending upon the quality of the label 1 or the quality of the ink used for printing the black bars. Then, the waveform of an output signal from the amplifier 3 has a different amplitude and includes a DC component. If the densely arranged bars are thin, a DC component is further included in the output signal from the amplifier 3 which has a waveform as shown in FIG. 3 waveform (A).

In view of this problem, the reference voltage to be supplied to the comparator 4 must be adjusted by the variable resistor 5 in a bar code reader adopting the DC method. However, such adjustment is extremely difficult to perform. On the other hand, in the reader adopting the AC method, an output from the buffer amplifier 7 has an attenuated oscillating waveform which is obtained by non-inverting amplification of an AC component after cutting off a DC component, by means of the differentiator 6, as shown in FIG. 3 waveform (B). When an output from the buffer amplifier 7 is compared with ground level (GND) by the comparator 4, the input signal does not fall below the threshold level at its initial portion, as shown in FIG. 3 waveform (C), so that correct A/D conversion cannot be performed. As a result, a bar code reader of this type cannot read densely recorded bars and can only read loosely recorded bar codes.

Since the attenuated oscillating waveform is compared with a predetermined threshold level, the pulse width of the resultant digital signal is significantly disturbed.

SUMMARY OF THE INVENTION

Accordingly the object of the present invention is to provide a data reader which is capable of converting any analog signal from a data reading means for reading recorded data into a correct digital signal.

In order to achieve the above object, there is provided according to the present invention a data reader comprising: data reading means for reading recorded data from an external recording medium and for producing an analog signal; a switching circuit having one terminal connected to an output terminal of said data reading means, said switching means being turned off when a potential difference between said one terminal thereof and the other terminal thereof falls within a predetermined range and said switching means being turned on when the potential difference falls outside the predetermined range; a hold circuit connected to the other terminal of said switching circuit and holding a potential applied thereto; and a comparator having a first input terminal connected to a node between said data reading means and said one terminal of said switching circuit and a second input terminal connected to a node between the other terminal of said switching circuit and said hold circuit, said comparator comparing a potential of the analog signal supplied to said first input terminal with a potential held by said hold circuit and supplied to the second input terminal, thereby producing a digital signal.

The reader of the present invention having the configuration as described above need not perform adjustment or the like of a reference voltage to be supplied to the comparator. Furthermore, the drawbacks of the conventional reader are eliminated; neither the problem of incorrect A/D conversion at the initial portion of the input signal nor the problem of significant disturbance in the pulse width occurs. Irrespective of density or the like of the recorded data, an analog signal can be correctly converted into a digital signal.

DETAILED DESCRIPTION OF THE PREFERRED EMBODIMENTS

Figure 2:
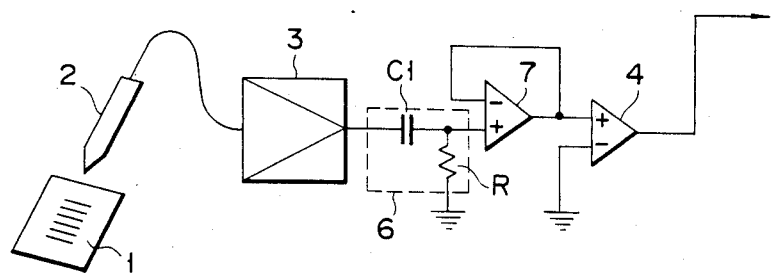
FIG. 2 is a view showing a conventional bar code reader adopting the AC method.
Figure 3:
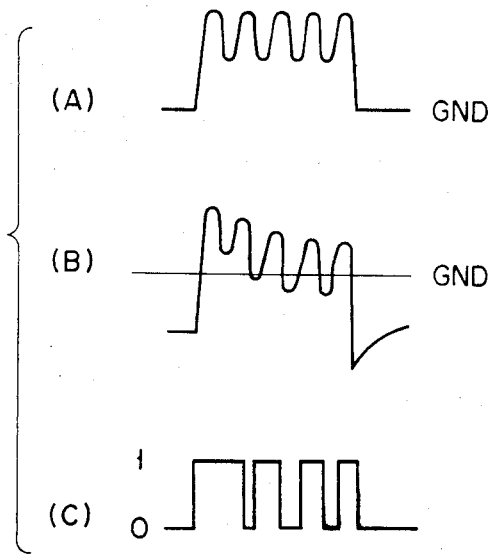
FIG. 3 shows the waveforms of signals at the respective parts of the readers shown in FIGS. 1 and 2.

The first preferred embodiment of the present invention will now be described with reference to FIGS. 4 and 5. A data reader of this embodiment is an optical bar code reader which adopts the AC method as described above. The same reference numerals as used in FIG. 2 denote the same parts in FIG. 4, and a detailed description thereof will be omitted. This embodiment includes a variable reference voltage generator 8 which is connected between the buffer amplifier 7 and the comparator 4. The variable reference voltage generator 8 varies the reference voltage to be supplied to the negative input terminal of the comparator 4 in accordance with an analog signal from the buffer amplifier 7.

The variable reference voltage generator 8 has a switching element 9 which, in turn, consists of a series circuit of Zener diodes D1 and D2 with their cathodes opposing each other. The anode of the Zener diode D1 is connected to a node X between the output terminal of the buffer amplifier 7 and the positive input terminal of the comparator 4. A capacitor C is interposed between the anode of the Zener diode D2 and ground. The capacitor C is parallel-connected to a diode D3 and a Zener diode D4 having their anodes opposing each other. The cathode of the diode D3 is connected to a node Y between the capacitor C and the Zener diode D2, and the cathode of the Zener diode D4 is connected to ground. Potential VY at the node Y between the Zener diode D2 and the capacitor C is supplied as a reference voltage to the negative input terminal of the comparator 4.

The mode of operation of the data reader having the configuration as described above will now be described with reference to FIGS. 4 and 5. Referring to FIG. 5 part (A), a solid curve shows the waveform of potential VX at the output point X of the buffer amplifier 7, while a broken curve shows the waveform of the potential VY at the output point Y of the variable reference voltage generator 8.

The switching element 9 is turned on when the difference between the potentials VX and VY at the points X and Y, respectively, exceeds a predetermined value. Then, a current flows from the point at the higher potential to the point at the lower potential. The switching element 9 is turned off when the potential difference is below the predetermined value. The condition for a current to flow from the point X to the point Y when the potential VX is higher than the potential VY is that the potential difference between the potentials VX and VY satisfies relations (1) and (2) below:

$$VX - VY \geq V1 \quad (1)$$

$$V1 = VF1 + VZ2 \quad (2)$$

where VF1 is the forward voltage of the Zener diode D1 and VZ2 is the Zener voltage of the Zener diode D2.

The condition for a current to flow from the point Y to the point X when the potential VY is higher than the potential VX is that the potential difference between the potentials VX and VY satisfies the following relations (3) and (4):

$$VY - VX \geq V2 \quad (3)$$

$$V2 = VF2 + VZ1 \quad (4)$$

where VF2 is the forward voltage of the Zener diode D2 and VZ1 is the Zener voltage of the Zener diode D1.

Figure 5:
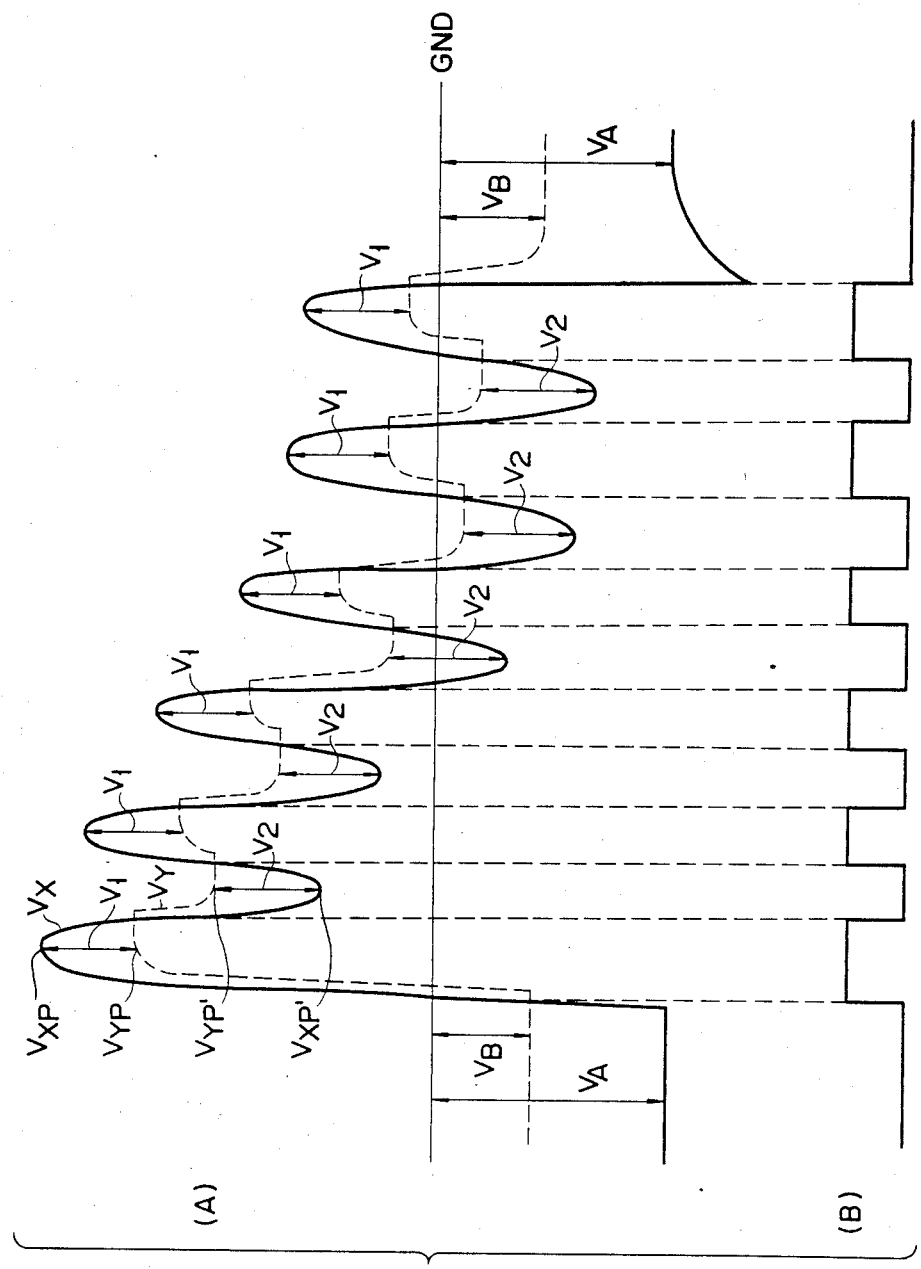
FIG. 5 shows the waveforms of signals at the respective parts of the reader shown in FIG. 4.

When the potential VX is lower than the ground level (GND) by a voltage VA satisfying relation (5) below as shown in FIG. 5, the potential VY is equal to the potential at the cathode of the diode D3 and is lower than the ground level (GND) by a voltage VB satisfying relation (6) below.

$$VA \geq V2 + VF3 + VZ4 \quad (5)$$

$$VB = VF3 + VZ4 \quad (6)$$

where VF3 is the forward voltage of the diode D3 and VZ4 is the Zener voltage of the Zener diode D4.

When the potential VX at the point X increases and reaches a value to satisfy equation (7) below, the switching element 9 is turned on in the direction from the point X to the point Y and a current flows from the point X to the point Y.

$$VX \geq V1 + (-VB) \quad (7)$$

Thus, the potential VY increases with an increase in the potential VX.

When the potential VX reaches an upper peak voltage VXP and thereafter the potential VX decreases to finally satisfy relation (8) below, the switching element 9 is turned off.

$$VX - VY < V1 \quad (8)$$

Consequently, the potential VY is held at a potential VYP lower than the peak potential at the point X by the potential difference V1, by means of the potential holding effect (holding effect) of the capacitor C. When the potential VX is further decreased to satisfy relation (9) below, the switching element 9 is turned on in the direction from the point Y to the point X and a current flows from the point Y to the point X. Thus, the potential VY is decreased with a decrease in the potential VX.

$$VX < VYP - V2 \quad (9)$$

When the potential VX reaches a lower peak voltage VXP' and then increases to satisfy relation (10) below, the switching element 9 is turned on again. As a result, the potential VY is held at a potential VYP' higher than the peak voltage VXP' at the point X by the potential difference V2.

$$VY - VX < V2 \quad (10)$$

When the potential VX further increases to satisfy relation (11) below, a current flows from the point X to the point Y again, and the potential VY increases with an increase in the potential VX.

$$VX > V1 + VYP' \quad (11)$$

A similar operation to that described above is repeated. Then, the potential VY has a waveform indicated by the broken line which is like a waveform obtained by omitting the portions near to peaks of the waveform of the potential VX indicated by the solid line in FIG. 5 part (a).

Since the AC voltage having such a waveform is applied to the negative input terminal of the comparator 4, the comparator 4 compares the two input signals and produces a signal of logic level as shown in FIG. 5 part (B).

Figure 1:
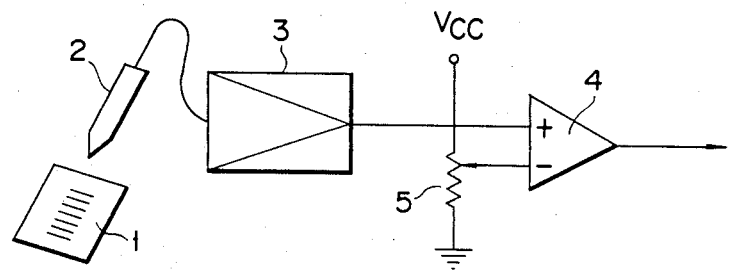
FIG. 1 is a view showing a conventional bar code reader adopting the DC method.

With the reader of the present invention, no error is generated in conversion of an initial portion of an analog signal into a digital signal. Furthermore, the resultant digital signal does not have a notably irregular pulse width. The variable reference voltage generator 8 may also be applied to a bar code reader adopting the DC method as shown in FIG. 1. In this case, the reader has the following configuration. The variable resistor 5 is omitted. The anode of the Zener diode D1 is connected to a node between the output terminal of the amplifier 3 and the positive input terminal of the comparator 4. The node between the anode of the Zener diode D2 and the capacitor C is connected to the negative input terminal of the comparator 4.

Figure 6:
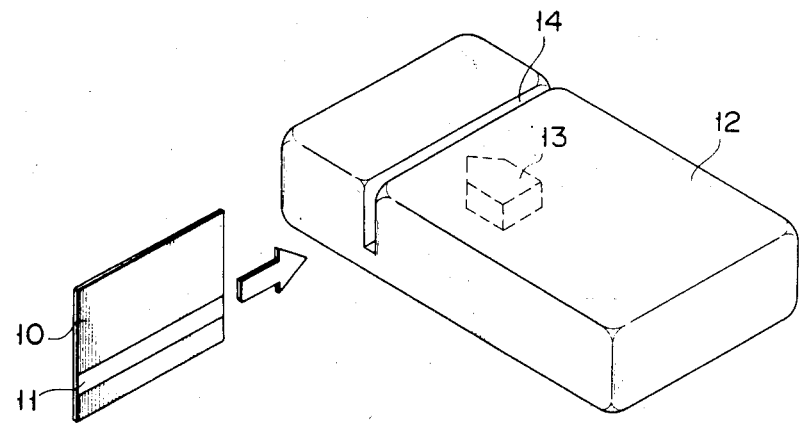
FIG. 6 is a perspective view of a data reader according to another embodiment of the present invention.

FIG. 6 is a schematic perspective view showing a data reading means according to another embodiment of the present invention. This embodiment is applied to a magnetic data reader for reading data recorded magnetically.

A card 10 is inserted into a groove 14 formed in a card reader 12. Data recorded on a magnetic recording portion 11 of the card 10 is read out by a magnetic head 13 and is produced as an analog signal.

Figure 4:
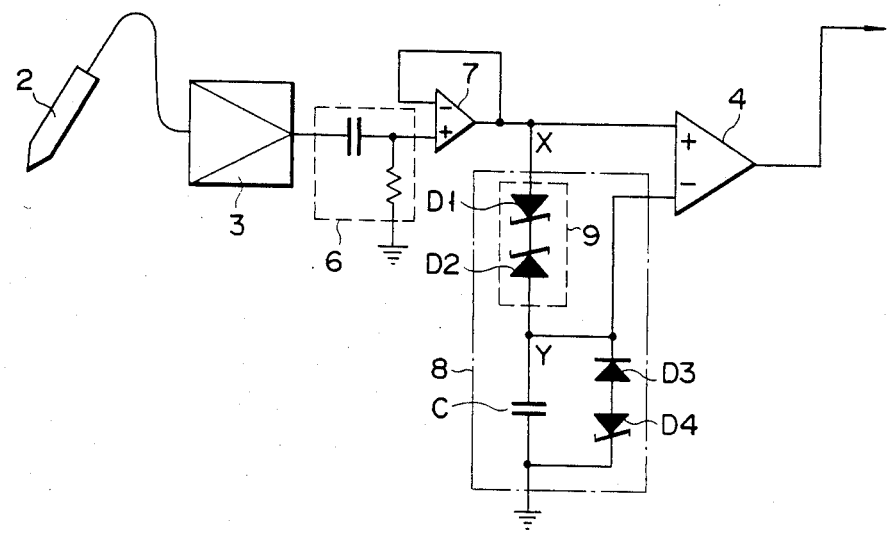
FIG. 4 is a circuit diagram of a data reader according to an embodiment of the present invention.

If the variable reference voltage generator 8 as shown in FIG. 4 is used as a circuit for converting this analog signal into a digital signal, an analog signal from the magnetic head 13 can be reliably converted into a digital signal.

In the embodiments described above, the switching element comprises two series-connected Zener diodes. However, the present invention is not limited to this. For example, a first group of a plurality of diodes may be series-connected in the forward direction, and then a second group of a plurality of series-connected diodes may be parallel-connected in the opposite direction to the first group of diodes.

The Zener diodes D1, D2, and D4 respectively need not be single Zener diodes but may be a combination of a plurality of Zener diodes. Similarly, each of the capacitors C and C1, the diode D3, the resistor R and so on need not comprise a single element, but may be a combination of a plurality of elements.

The each embodiment described above, is a data reader for optically reading bar code data by the AC or DC method and to a data reader for magnetically reading data recorded on a card. However, the present invention is not limited to this. The present invention may be similarly applied to various other types of data readers such as a data reader for optically or magnetically reading characters.

What is claimed is:

1. A data reader comprising:
   data reading means for reading recorded data from an external recording medium and for producing an analog signal;
   a switching circuit having first and second terminals, said first terminal being connected to an output terminal of said data reading means, said switching circuit being turned off when a potential difference between said first terminal and said second terminal falls within a predetermined range and said switching means being turned on when the potential difference falls outside the predetermined range;
   a hold circuit for holding a potential applied thereto, said hold circuit comprising a diode the cathode of whidh is connected to the second terminal of said switching circuit, a Zener diode the anode of which is connected to the anode of said diode and a capacitor parallel-connected between the cathode of said diode and the cathode of said Zener diode; and
   a comparator having a first input terminal connected to a node between said data reading means and said first terminal of said switching circuit and a second input terminal connected to a node between said second terminal of said switching circuit and said hold circuit, said comparator comparing a potential of the analog signal supplied to said first input terminal with a potential held by said hold circuit and supplied to the second input terminal, thereby producing a digital signal.

2. A data reader according to claim 1, wherein said switching circuit comprises first and second Zener diodes having cathodes thereof connected to oppose each other.

3. A data reader according to claim 1, which further includes a differentiator comprising:
   a capacitor which has one terminal connected to an output terminal of said data reading means and the other terminal connected to said first input terminal of said comparator, and
   a resistor having one terminal connected to a node between the other terminal of said capacitor and said first input terminal of said comparator and the other terminal connected to ground.

4. A data reader according to claim 3, which further includes an amplifier having an input terminal connected to an output terminal of said differentiator and an output terminal connected to said first input terminal of said comparator.

* * * * *